United States Patent
Yasui (10) Patent No.: US 12,283,067 B2
(45) Date of Patent: Apr. 22, 2025

(54) DISTANCE MEASURING APPARATUS AND DISTANCE MEASURING METHOD

(71) Applicant: HONDA MOTOR CO., LTD., Tokyo (JP)

(72) Inventor: Yuji Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 433 days.

(21) Appl. No.: 17/705,293

(22) Filed: Mar. 26, 2022

(65) Prior Publication Data

US 2022/0319037 A1    Oct. 6, 2022

(30) Foreign Application Priority Data

Mar. 30, 2021    (JP) ................. 2021-058437

(51) Int. Cl.
  *G06T 7/70* (2017.01)
  *G06T 3/40* (2024.01)
  *G06V 20/58* (2022.01)

(52) U.S. Cl.
  CPC ........... *G06T 7/70* (2017.01); *G06T 3/40* (2013.01); *G06V 20/58* (2022.01)

(58) Field of Classification Search
  USPC ........................................................ 382/103
  See application file for complete search history.

(56) References Cited

U.S. PATENT DOCUMENTS

| 5,875,264 A | * | 2/1999 | Carlstrom | G06V 30/184 |
| | | | | 382/181 |
| 9,152,887 B2 | | 10/2015 | Muramatsu | |
| 2002/0136449 A1 | * | 9/2002 | Park | G06V 10/56 |
| | | | | 382/164 |
| 2022/0019441 A1 | * | 1/2022 | Rosing | G06N 3/084 |

FOREIGN PATENT DOCUMENTS

| CN | 107687841 A | 2/2018 |
| EP | 3009789 A1 | 4/2016 |
| JP | 2011-64639 A | 3/2011 |
| WO | 2012/164804 A1 | 12/2012 |
| WO | 2014/199929 A1 | 12/2014 |

OTHER PUBLICATIONS

Office Action dated Nov. 28, 2022, issued in counterpart JP application No. 2021-058437, with partial English translation. (3 pages).
Office Action dated Jan. 18, 2024 issued in counterpart CN application No. 202210312110.6, with English translation. (12 pages).

* cited by examiner

*Primary Examiner* — Darryl V Dottin
(74) *Attorney, Agent, or Firm* — WHDA, LLP (57) ABSTRACT

A distance measuring apparatus is provided. The apparatus comprises an image acquisition unit that acquires time-series images by an imaging unit, and a processing unit that performs image processing. The processing unit generates a plurality of enlarged images obtained by enlarging a reference image acquired before a target image among the time-series images at a plurality of types of different enlargement rates. The processing unit obtains a difference between (Continued)

each of the plurality of enlarged images and the target image, detects a target object that is a subject from the target image, and specifies a distance to the detected target object on the basis of the enlargement rate of the enlarged image with which the difference is minimum.

7 Claims, 6 Drawing Sheets

DISTANCE MEASURING APPARATUS AND DISTANCE MEASURING METHOD

CROSS-REFERENCE TO RELATED APPLICATION(S)

This application claims priority to and the benefit of Japanese Patent Application No. 2021-058437 filed on Mar. 30, 2021, the entire disclosure of which is incorporated herein by reference.

BACKGROUND OF THE INVENTION

Field of the Invention

The present invention relates to a distance measuring apparatus, and more particularly to a distance measuring apparatus and a distance measuring method for measuring a distance from a moving body such as a vehicle to an object on the basis of an image.

Description of the Related Art

There is a technique for estimating a distance to a target object such as a pedestrian or another vehicle for automated driving or driving assistance of a vehicle. For automated driving and driving assistance, the vehicle attracts attention of the driver according to the estimated distance, or automatically applies the brake without operation by the driver. One of the techniques for estimating the distance is a technique for estimating the distance to a subject from an image captured by a camera. For example, International Publication No. 2012/164804 discloses a technique of extracting a distance-dependent video corresponding to a distance from a vehicle on the basis of the position of a foot of an image of a person included in an input video, and synthesizing a synthesized video using the distance-dependent video. In addition, International Publication No. 2014/199929 proposes a technique for estimating a distance to an object in an image from an optical flow of a plurality of images captured in time series and a velocity of a moving body.

However, in International Publication No. 2012/164804, the deviation of the position of the foot lowers the accuracy of the distance, and in International Publication No. 2014/199929, high-load processing such as motion vector extraction is required.

SUMMARY OF THE INVENTION

The present invention provides a technique for measuring a distance with light load and high accuracy on the basis of an image.

The present invention has the configuration described below.

That is, according to one aspect of the present invention, provided is a distance measuring apparatus comprising: an image acquisition unit that acquires time-series images by an imaging unit; and a processing unit that performs image processing, wherein the processing unit includes at least one processor and at least one memory having at least one program, and the at least one program causes the at least one processor to generate a plurality of enlarged images obtained by enlarging a reference image acquired before a target image among the time-series images at a plurality of types of different enlargement rates and obtain a difference between each of the plurality of enlarged images and the target image, detect a target object that is a subject from the target image, and specify a distance to the detected target object on the basis of the enlargement rate of the enlarged image with which the difference is minimum.

According to the present invention, it is possible to measure a distance with light load and high accuracy on the basis of an image.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

First Embodiment

Configuration of Vehicle Control Apparatus

Figure 1:
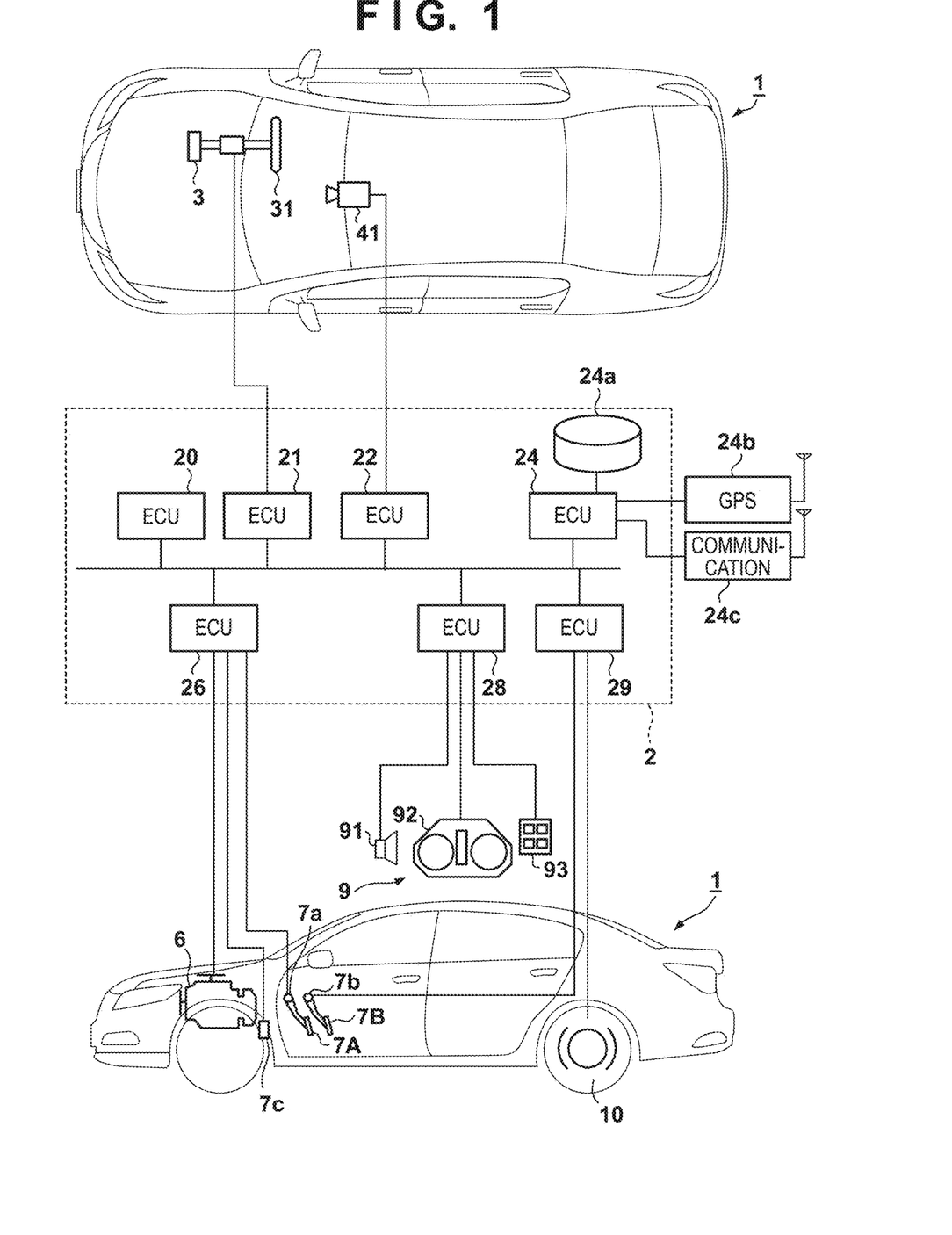
FIG. 1 is an explanatory diagram illustrating a configuration of a vehicle system.

FIG. 1 is a block diagram of a vehicle control apparatus in accordance with an embodiment of the present invention, and the vehicle control apparatus controls a vehicle 1. In FIG. 1, the vehicle 1 is schematically illustrated in a plan view and a side view. The vehicle 1 is, for example, a four-wheeled passenger vehicle of a sedan type. Note that, in the present embodiment, the driving assistance provided by the vehicle control apparatus has limited functions such as emergency braking, adaptive follow-up traveling, and lane keeping assistance, but may have advanced functions such as automated driving when a destination is set.

The control apparatus of FIG. 1 includes a control unit 2. The control unit 2 includes a plurality of electronic control units (ECUs) 20 to 29, which are communicably connected through an in-vehicle network. Each ECU includes a processor represented by a central processing unit (CPU), a storage device such as a semiconductor memory or the like, an interface with an external device, and the like. In the storage device, programs executed by the processor, data used for processing by the processor, and the like are stored. Each ECU may include a plurality of processors, storage devices, interfaces, and the like.

Hereinafter, functions and the like assigned to the ECUs 20 to 29 will be described. Note that the number of ECUs and the functions assigned to the ECUs can be designed as appropriate, and can be subdivided or integrated, when compared with the present embodiment.

The ECU 20 executes control related to automated driving of the vehicle 1. In automated driving, at least one of the steering and acceleration/deceleration of the vehicle 1 is automatically controlled.

The ECU 21 controls an electric power steering apparatus 3. The electric power steering apparatus 3 includes a mechanism for steering front wheels in accordance with a driver's driving operation (steering operation) on a steering wheel 31. In addition, the electric power steering apparatus 3 assists a steering operation, or includes a motor for exerting driving force to conduct automated steering of the front wheels, a sensor for detecting a steering angle, and the like. In a case where the driving state of the vehicle 1 is automated driving, the ECU 21 automatically controls the electric power steering apparatus 3 in response to an instruction from the ECU 20, and controls the traveling direction of the vehicle 1.

The ECU 22 controls a detection unit 41 that detects surrounding situations of the vehicle, and performs information processing of the detection results. The detection unit 41 is a camera that captures an image of a front of the vehicle 1 (hereinafter, referred to as a camera 41, in some cases), and one detection unit is fixedly provided at the front of the roof of the vehicle 1 in the present embodiment. By analyzing the image that has been captured by the camera 41, the ECU 22 can extract a contour of a target object or extract a division line (white line or the like) of a lane on a road. In addition, the distance to the target object in the image can be estimated.

The ECU 24 controls a global positioning system (GPS) sensor 24b and a communication apparatus 24c, and performs information processing on detection results or communication results. The GPS sensor 24b detects the current location of the vehicle 1. The communication apparatus 24c performs wireless communication with a server that provides map information and traffic information and acquires these pieces of information. The ECU 24 is capable of accessing a map information database 24a constructed in the storage device, and the ECU 24 searches for a route or the like from the current location to a destination.

The ECU 26 controls a power plant 6. The power plant 6 is a mechanism that outputs driving force for rotating driving wheels of the vehicle 1, and includes, for example, an engine and a transmission. For example, the ECU 26 controls the output of the engine according to the driving operation (accelerator operation or acceleration operation) of the driver detected by an operation detection sensor 7a provided on an accelerator pedal 7A and switches the gear ratio of the transmission on the basis of information such as the vehicle speed detected by a vehicle wheel speed sensor 7c.

The ECU 28 controls an input and output apparatus 9. The input and output apparatus 9 outputs information to the driver and accepts an input of information from the driver. A voice output apparatus 91 notifies the driver of information by voice. A display apparatus 92 notifies the driver of information by displaying an image. The display apparatus 92 is located in front of a driver's seat, for example, and constitutes an instrument panel or the like. Note that, although the voice and the display have been given as examples here, a notification of information may be given by vibration or light. An input apparatus 93 is a switch group, a touch panel, or the like that is arranged at a position where the driver can operate it and is used to input an instruction to the vehicle 1, and may also include a voice input apparatus.

The ECU 29 controls a brake apparatus 10 and a parking brake (not illustrated). The brake apparatus 10 is, for example, a disc brake apparatus, is provided on each wheel of the vehicle 1, and applies resistance to the rotation of the wheels to decelerate or stop the vehicle 1. The ECU 29 controls actuation of the brake apparatus 10 in response to the driver's driving operation (brake operation) detected by an operation detection sensor 7b provided on a brake pedal 7B, for example. For example, when the distance to the target object detected from the image falls below a predetermined value or when the estimated time to collision falls below a predetermined value, the ECU 29 automatically controls the brake apparatus 10 in response to an instruction from the ECU 20 to control deceleration and/or stop of the vehicle 1. The brake apparatus 10 and the parking brake are also capable of actuating to maintain a stopped state of the vehicle 1. In addition, in a case where the transmission of the power plant 6 is provided with a parking lock mechanism, the parking lock mechanism is also capable of actuating to maintain the stopped state of the vehicle 1.

Image-Based Distance Estimation Function

Figure 2A:
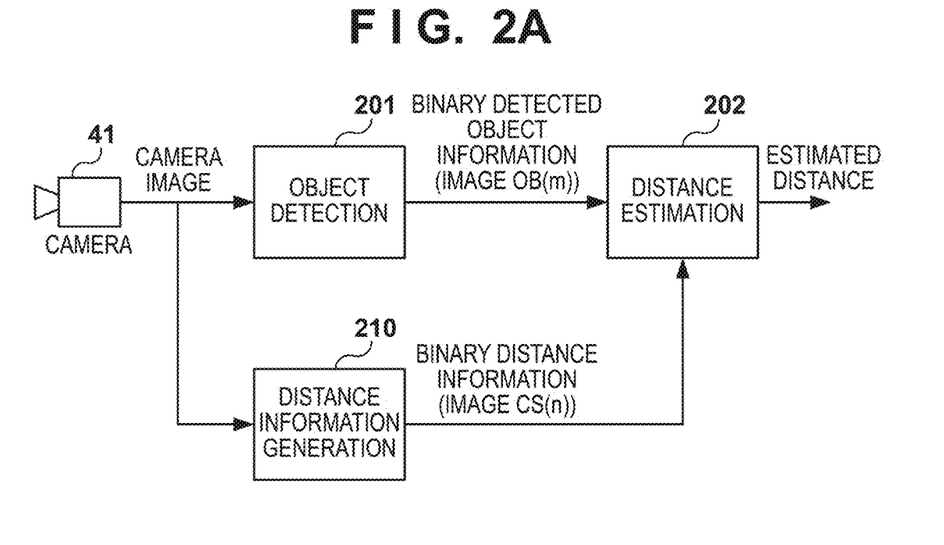
FIG. 2A is a block diagram illustrating a configuration for distance measurement.

FIG. 2A is a block diagram of a distance estimation function (i.e., distance measuring apparatus) realized by the ECU 22. This configuration may be realized by a hardware circuit included in the ECU 22, or may be realized by executing a program recorded in a memory by a CPU included in the hardware circuit. In addition, it may be realized by a combination thereof. The same applies to other ECUs. With any configuration, the ECU 22 or the other ECUs function as an information processing apparatus, an image processing apparatus, or a signal processing apparatus. In addition, it may function as a distance measuring apparatus.

The camera 41 is an imaging apparatus such as a monocular camera, and captures a video at a predetermined frame rate, for example, i.e., time-series images. The captured video is composed of frames at predetermined time intervals, and each frame is referred to as an image here. The captured image is sent to an object detection unit 201 and a distance information generation unit 210 at predetermined time intervals. The predetermined time intervals may be a reciprocal of the frame rate or an integral multiple thereof.

The object detection unit 201 detects an object corresponding to a target object, such as a person or an object, which is a subject, included in the image. Information regarding the detected object is input to a distance estimation unit 202 as binary detected object information. The binary detected object information is generated for each detected target object, and these are also referred to as images OB(m) (m=1 to the number of target objects). The distance information generation unit 210 generates binary distance information indicating a distance for each target object corresponding to an object included in the image. The generated binary distance information is input to the distance estimation unit 202. In this example, a predetermined number (N) of pieces of binary distance information are generated, and these are also referred to as images CS(n) (n=1 to N). Note that when no object is detected, it is not necessary to specify the distance.

The distance estimation unit 202 estimates or specifies a distance for each detected object on the basis of the input binary detected object information and binary distance information. As will be described in detail with reference to FIG. 5, the estimation method can be said to estimate the distance for each detected object by generating a value indicating the correlation between the binary detected object information and the binary distance information and specifying the distance having the highest correlation with respect to the object in the image.

Outline of Distance Measurement

Here, the relationship between the enlargement rate of the image and the distance as the basis of the distance measurement of the present embodiment will be described. An image k is an image captured by the camera 41 fixed to the traveling vehicle after an image k-1, and a subject not moving in a line-of-sight direction is enlarged in the image k with respect to the image k-1. That is, the viewing angle increases. Moreover, the enlargement rate varies depending on the distance to the subject. For example, it is assumed that the vehicle has captured the image k-1, travelled a certain distance, and captured the image k. In this case, the enlargement rate of the target object, which is the subject included in the image k, with respect to the image k-1 decreases according to the distance to the subject. For example, a capture interval (distance) between the image k-1 and the image k is D, a distance to a target object P at the time of capturing the image k is L, and an enlargement rate of the target object P of the image k with respect to the target object P of the image k-1 is E. At this time, the enlargement rate E is E=1+D/L, and the larger the distance L to the target object P, the smaller the enlargement rate E. By using this, the distance L can be obtained as L=D/(E−1) by specifying the enlargement rate E and the distance D.

Figure 6:
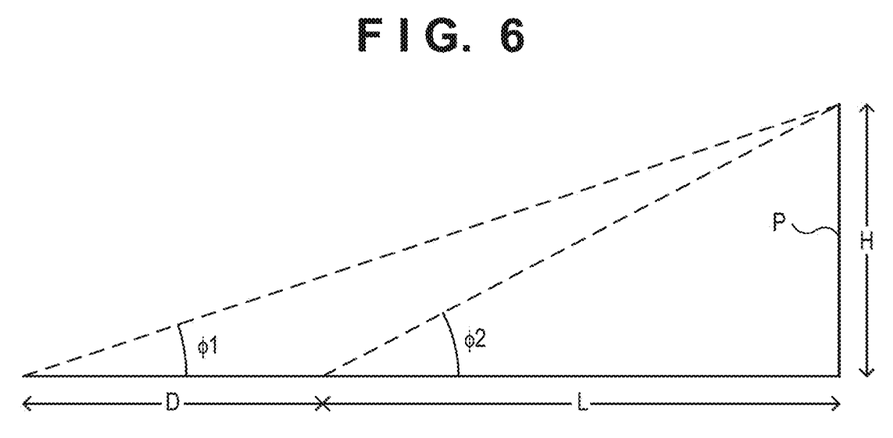
FIG. 6 is a schematic diagram illustrating a relationship between a viewing angle and a distance.

FIG. 6 illustrates a schematic diagram of the example. The actual height of the target object P is H, the distance to the target object P at the time of capturing the image k-1 is L+D, and the distance to the target object P at the time of capturing the image k is L. That is, the image k-1 is captured, and the image k is captured at the position of the distance L from the target object P by advancing by the distance D. In addition, the viewing angle of the target object P at the time of capturing the image k-1 is φ1, and the viewing angle of the target object P at the time of capturing the image k is φ2.

The height of the object corresponding to the target object P appearing in the captured image is proportional to tan φ, where φ is the viewing angle of the target object P. That is, when the height (the number of pixels) of the object appearing in the image is h and a coefficient for converting tan φ into the number of pixels is k, they can be expressed as h=k·tan φ. When this is applied to the target object P in FIG. 6, heights h1 and h2 of the target object P in the image k-1 and image k are expressed as follows:

$h1 = k \cdot \tan \varphi1 = k \cdot (H/L+D)$ $h2 = k \cdot \tan \varphi2 = k \cdot (H/L)$. Thus, L+D and L become as follows:

$L+D = H/\tan \varphi1$ and $L = H/\tan \varphi2$ and

L/(L+D)=tan φ1/tan φ2. Here, tan φ2/tan φ1 represents the ratio of the height of the target object P in the image k to the height of the target object P in the image k-1, that is, the enlargement rate E. That is, L/(L+D)=1/E. Assuming that a moving velocity is v and a capture interval is t, D=vt, and $$L = D/(E-1) = vt/(E-1) \qquad (1).$$

The velocity v is the velocity of the vehicle 1, and can be acquired from the vehicle wheel speed sensor 7c or the like. In addition, the capture interval t can also be determined on the basis of the frame rate, for example. Therefore, the distance to the target object corresponding to the object (target object) can be specified by specifying the object (target object) in the image and the enlargement rate E thereof. The distance measuring apparatus according to the present embodiment specifies the enlargement rate E between images captured at predetermined time intervals, and estimates the distance L associated with the enlargement rate as the distance to the target object on the basis of the enlargement rate.

Distance Information Generation Unit

Figure 2B:
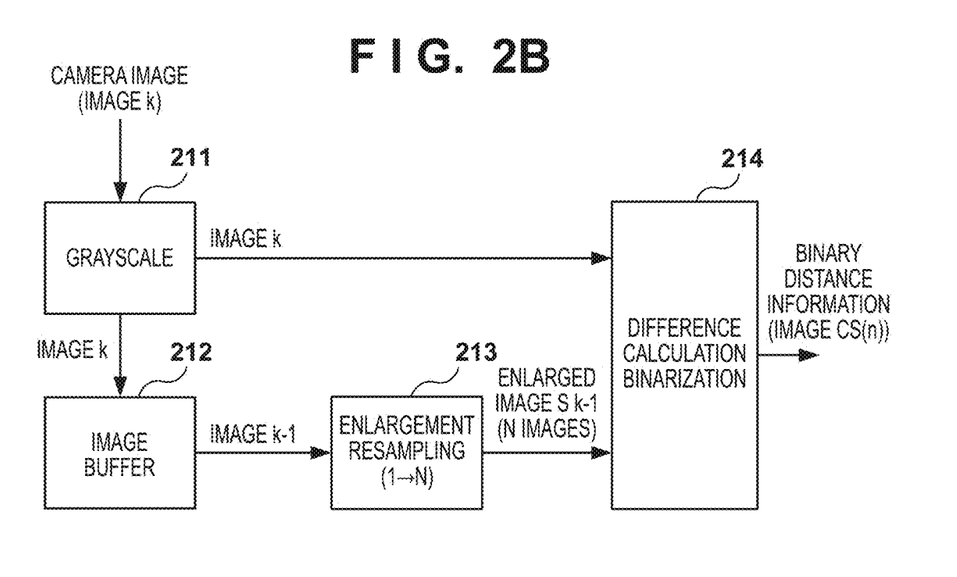
FIG. 2B is a block diagram illustrating a configuration for distance measurement.

The distance information generation unit 210 generates binarized distance information indicating the enlargement rate E for each object described in the above outline. FIG. 2B is a block diagram illustrating details of the distance information generation unit 210. An image (referred to as an image k or a target image) captured by the camera 41 is input to a grayscale processing unit 211 and processed into a grayscale image. When the camera 41 is a monochrome camera, processing is not particularly necessary. The grayscaled image k is input to an image buffer 212 and a difference calculation binarization unit 214.

The image buffer 212 stores the image k until the next image is input. Therefore, the image output from the image buffer 212 is the image immediately before the image k, i.e., the image k-1. Note that the immediately preceding image does not necessarily target all frames captured in time series, and a predetermined number of frames may be skipped and set an image as "immediately preceding". The image k-1 is input to an enlargement resampling unit 213.

The enlargement resampling unit 213 enlarges and resamples the image k-1. The enlargement rate is N types of different enlargement rates, and thus N enlarged images k-1(n) are generated. The enlarged images k-1(n) are input to the difference calculation binarization unit 214.

The difference calculation binarization unit 214 obtains a difference between each of the input enlarged images k-1(n) and the image k. The difference is output as a difference image having a difference in value between corresponding pixels as a pixel. Further, the difference calculation binarization unit 214 binarizes each difference image and outputs an image CS(n), which is binarized distance information.

Figure 3:
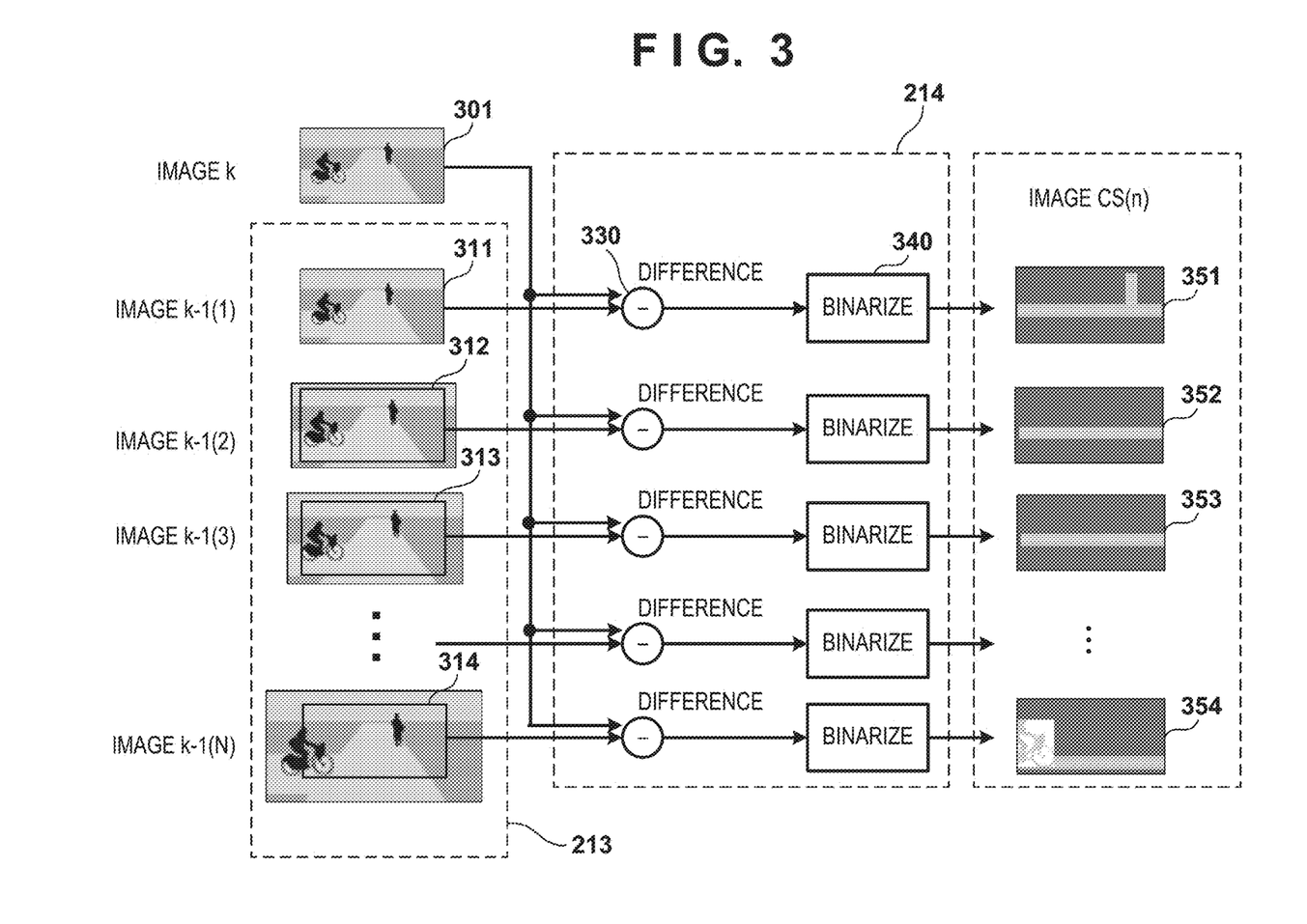
FIG. 3 is a block diagram illustrating a configuration for acquisition of distance information.

FIG. 3 illustrates a schematic diagram of processing of generating binary distance information (images CS(n) (n=1 to N)) by the enlargement resampling unit 213 and the difference calculation binarization unit 214 of the distance information generation unit 210. The enlargement resampling unit 213 enlarges the original image k-1. Here, N types of enlargement rates of 1 or more are used, but enlargement of an enlargement rate of 1 (equal enlargement) may not be performed. In FIG. 3, regions having the same size as the image k are clipped out from the respective enlarged images k-1(n) and output as images 311 to 314. In this example, the clipped-out range is set to, but is not limited to, the center of the image. In addition, a plurality of images k-1(n)(p) (here, P=1 to the number of clipped out images) obtained by changing the clipping position from one image k-1(n) may be output.

Each of the N enlarged images k-1(n) is input to a differentiator 330, and a difference for each corresponding pixel of the image k (image 301) is obtained. An image having the obtained difference as a pixel is referred to as a difference image. Note that since the difference is referred to as a measure of the magnitude of the difference, the obtained difference is desirably an absolute value. Therefore, in a case where there is no normal sign bit in the pixel value, for example, a difference may be calculated by adding a positive sign bit to the pixel value, and as a result, in a case where the sign bit is inverted, a complement of 2(10b) may be obtained to obtain an absolute value.

The difference image is input to a binarizer 340 and converted into a binarized image. This is binarized distance information (that is, image CS(n), n=1 to N) 351 to 354. In the binarized distance information, the value of the pixel in which the difference between the corresponding pixels of the image k and the image k-1($n$) is equal to or less than the threshold value is 1, and the value of the pixel that is not so is 0. That is, the portion of the pixel having a value of 1 (for example, indicated by black) has a high degree of coincidence between the image k and the image k-1($n$), and the portion of the pixel having a value of 0 (for example, indicated by white) has a low degree of coincidence between the image k and the image k-1($n$). This is shown for each magnification with respect to the image k-1. As described above, in the binarization processing of the difference image, the difference image is not simply binarized in comparison with the threshold value, but the value binarized in comparison with the threshold value is further inverted.

The binarized distance information generated by the distance information generation unit 210 includes information regarding the distance of each object included in the image k. For example, focusing on the image k-1($n$) enlarged at an enlargement rate E1, in the image CS(n) generated from the image k-1($n$), a region of an object regarding which the image k-1($n$) and the image k coincide with each other is indicated by a pixel value of 1. That is, it is considered that the object is enlarged at the enlargement rate E1 in the image k with respect to the image k-1. Although there may be partial coincidence even if the magnification is slightly changed, it can be considered that the image k-1 having the largest number of coincident pixels has the highest degree of coincidence among the enlarged images of the plurality of types of enlargement rates. From this, it can be said that the binarized distance information, that is, the image CS(n) (n=1 to N) is an image group indicating the enlargement rate of the object included in the image k with respect to the image k-1.

Object Detection Processing

Figure 4:
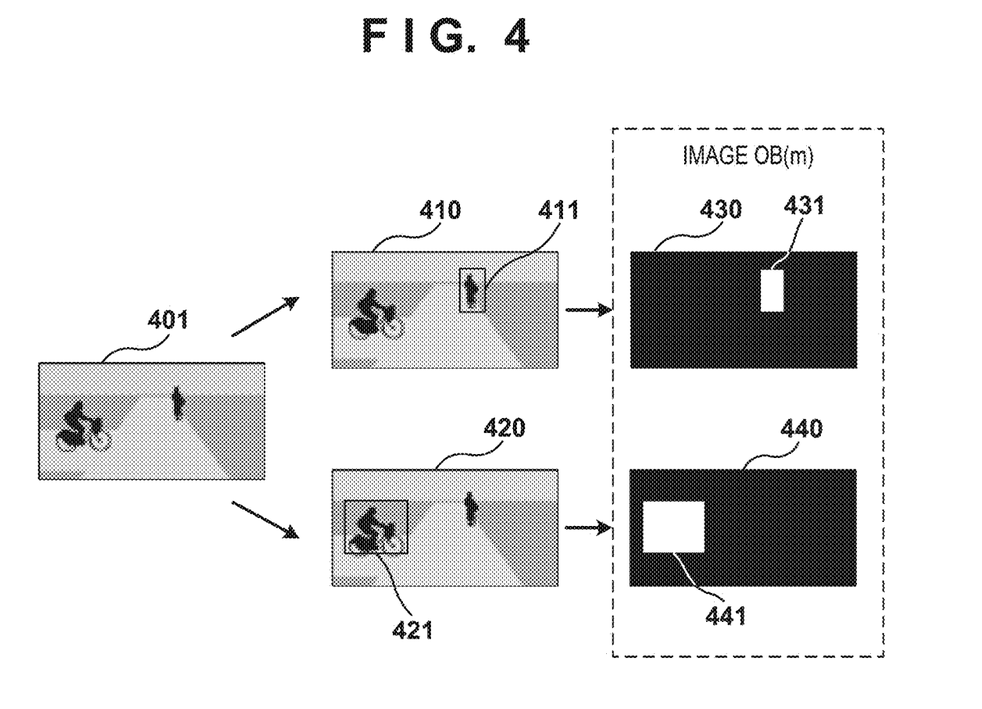
FIG. 4 is a block diagram illustrating a configuration for acquisition of detected object information.

FIG. 4 illustrates an example of object detection processing by the object detection unit 201. The object detection unit 201 detects a target object including a person, an object, and the like from the image k (image 401). The detection can use, for example, machine learning. A target object for which the distance is to be obtained, such as a person or an object in an image, is learned, and the target object is detected from the image using learned learning data. Of course, in addition to this, an edge or the like of the image may be detected, and the target object may be specified from the characteristics.

When a target object is detected, the region of an object corresponding to the detected target object is specified. The region of this object is shown in different images for each object. For example, a region 411 is specified in an image 410, and a region 421 is specified in an image 420. The object detection unit 201 further generates, for example, a binary image in which the region of the object is indicated by 1 and the other regions are indicated by 0. This is the binary detected object information (image OB(n)). In the example of FIG. 4, an object region 431 is included in an image 430, and an object region 441 is included in an image 440. As described above, the region of the target object shown in the image is indicated in the binary detected object information.

Distance Estimation Processing

Figure 5:
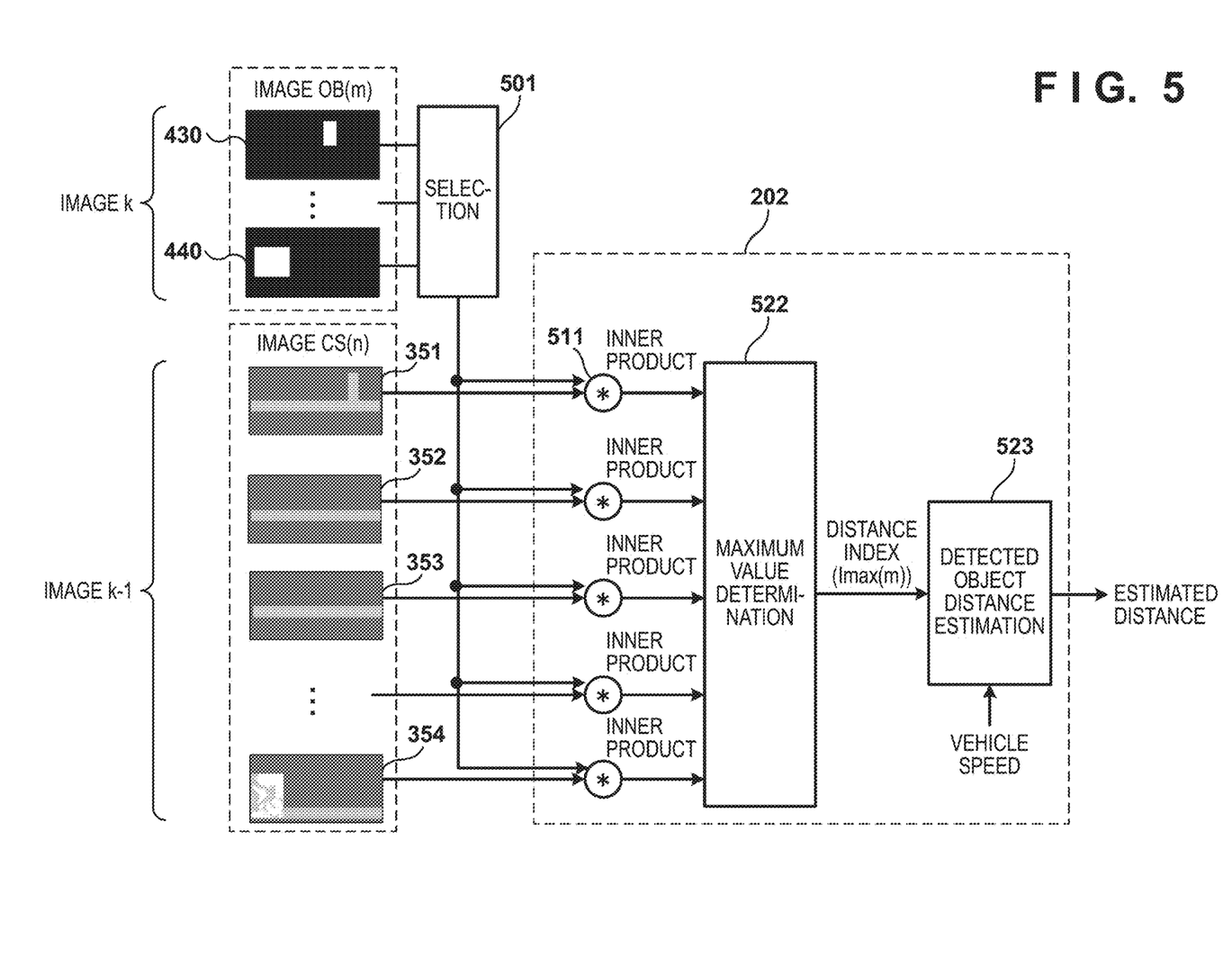
FIG. 5 is a block diagram illustrating a configuration for distance measurement.

FIG. 5 illustrates a configuration of the distance estimation unit 202. The binary detected object information (image OB(m)) generated from the image k and the binary distance information (image CS(n)) generated from the image k-1 are input to the distance estimation unit 202. Here, the detected object included in the binary detected object information is indicated by m ($0 \leq m \leq M$), and the number of enlargement rates included in the binary distance information is n ($1 \leq n \leq N$). Note that although not illustrated, these pieces of information are synchronized with each other for comparison.

The distance estimation unit 202 includes n inner product calculators 511. Each of the images included in the plurality of images CS(n) is input to each of the inner product calculators 511. In addition, one of the images OB(m) selected by a selector 501 is input to the other inputs of the inner product calculators 511. That is, it can be said that the selector 501 selects one of the detected objects. The target object specified by the image OB(m) will be referred to as a target object m. Then, the inner product calculators 511 calculate an inner product of the selected image OB(m) and each of the images CS(n). The inner product calculated for the image CS(n) is a distance determination parameter PD(n). That is, the n-th inner product calculator 511 performs the following calculation:

$$PD(n) = \Sigma\Sigma(OB_n(p,q) \cdot CS_m(p,q)).$$

Note that, in the above formula, images previously represented as OB(n) and CS(m) are represented as $OB_n$ and $CS_m$, respectively. In addition, p and q are indexes indicating pixels in the image, and here indicate one coordinate of a pixel unit, and satisfy $1 \leq p \leq P$ and $1 \leq q \leq Q$. Two $\Sigma$ indicate the sum from 1 to the maximum value for each of p and q. Thus, the degree of coincidence between the image k and the enlarged image k-1 in the region where the object has been detected is indicated by the distance determination parameter PD(n).

The distance determination parameter PD(n) calculated for each of the images CS(n) enlarged at different magnifications is input to a maximum value determination unit 522, and an index n of the input maximum value is output. This index indicates an inner product calculator that has output the maximum value among the N inner product calculators 511. Since the enlargement rate of the original image k-1 is determined when the inner product calculator is determined, this index is an index indicating the enlargement rate of the target object m in the image k with respect to the image k-1. This is called a distance index (Imax(m)).

The distance index (Imax(m)) is input to a detected object distance estimation unit 523, and the distance of the target object m is specified. In the present embodiment, the distance is specified by referring to a data set such as a table prepared in advance. For example, a predetermined data set, for example, a two-dimensional table, in which the image capture interval time is set to a fixed value, the velocity of the vehicle and the distance index are set as parameters, and the values and the distances are associated with each other is prepared. Then, the detected object distance estimation unit 523 outputs the distance corresponding to the acquired vehicle speed and the determined distance index as the distance specified regarding the target object. The association between the parameter such as the distance index and the distance may be determined experimentally, for example, or may be determined according to Formula (1).

Of course, another method may be adopted. For example, the vehicle speed v is acquired from the vehicle wheel speed sensor 7c, a predetermined capture interval is used, and the enlargement rate E corresponding to the distance index (Imax(m)) is specified (the enlargement rate and the index may be associated in advance). Then, as in Formula (1), the distance may be calculated as L=vt/(E−1).

The above is processing for one image OB(m). When the distance to one image OB(m), that is, one target object is specified, the selector 501 selects and outputs an unprocessed next image OB(m+1). Then, the above processing is executed on the image OB(m+1). Thus, the distance to a target object m+1 can be specified. This is executed on the generated image OB(m), and the distance to the corresponding target object is specified for all objects included in the image k.

With the above configuration and processing, the distance measuring apparatus of the present embodiment can specify the distance to the target object shown on the image, from the image, particularly the image captured by the monocular camera. With this configuration, the distance can be specified by combining simple pieces of processing.

Note that, since the image CS(n) is a binary image in which a pixel in which the difference between the image k and the image k-1 is smaller than the threshold value is indicated by 1, it can be said that the maximum value determination unit 522 outputs the index of the image k-1 having the smallest difference between the image k and the image k-1 in the object region.

Another Embodiment

The first embodiment indicates that when the image k-1 is enlarged and clipped out, the position of the clipping-out region may be changed, and a plurality of enlarged images may be generated from the image k-1 enlarged at one enlargement rate. To describe this in more detail, among the plurality of enlarged images generated from one enlarged image k-1, one image having the highest correlation with the image k may be set as the representative of the enlarged images of the enlargement rate, and the other images may be discarded. The correlation with the image k is indicated by, for example, the sum of pixel values after binarization by the binarizer 340. In this example, an image having the largest sum of pixel values after binarization may be used as the representative. This is because the portion coincident with the image k is indicated by a pixel value of 1 after the binarization. Thus, as in the first embodiment, the output from the difference calculation binarization unit 214 is N images CS(n) in the case of N types of enlargement rates. Therefore, the processing by the distance estimation unit 202 may be similar to that of the first embodiment.

Thus, the accuracy of the information indicating the distance for each target object included in the binary distance information can be further improved.

Summary of Embodiments

The above-described embodiments at least disclose the distance measuring apparatus described below.

1. The distance measuring apparatus of the aforementioned embodiment includes:
an image acquisition unit that acquires time-series images by an imaging unit; and
a processing unit that performs image processing, in which
the processing unit
generates a plurality of enlarged images obtained by enlarging a reference image acquired before a target image among the time-series images at a plurality of types of different enlargement rates and obtains a difference between each of the plurality of enlarged images and the target image,
detects a target object that is a subject from the target image, and
specifies a distance to the detected target object on the basis of the enlargement rate of the enlarged image with which the difference is minimum.

With this configuration, the distance to the target object included in the image can be measured.

2. The distance measuring apparatus of the aforementioned embodiment, in which
the processing unit binarizes the target image in association with each of the detected target objects and obtains a difference between each of the binarized target images and each of the plurality of binarized enlarged images.

With this configuration, by binarizing the target image for each target object included in the image, processing of a plurality of target objects included in the image can be facilitated.

3. The distance measuring apparatus of the aforementioned embodiment, in which
the processing unit specifies a distance for each of the target objects on the basis of the enlargement rate of the enlarged image with which the difference is minimum for each of the detected target objects.

With this configuration, the distance to the target object can be specified for each target object included in the image.

4. The distance measuring apparatus of the aforementioned embodiment, in which
the processing unit sets the enlarged image in which a sum of values obtained by binarizing and inverting a difference between corresponding pixels in a region of an attention object is maximum as an enlarged image with which the difference is minimum.

With this configuration, the calculation is simplified and the processing load is reduced.

5. The distance measuring apparatus of the aforementioned embodiment, in which
the processing unit specifies the distance to the target object using a predetermined data set in which distances are registered in association with enlargement rates.

With this configuration, the distance can be specified with reference to a predetermined data set, and the processing load is reduced.

6. The distance measuring apparatus of the aforementioned embodiment, in which
the processing unit specifies the distance to the target object using a predetermined data set in which a distance is registered in further association with a moving velocity of the imaging unit in addition to the enlargement rate.

With this configuration, the accuracy of the specified velocity can be further improved by using the distance as the index.

7. The distance measuring apparatus of the aforementioned embodiment, in which
the processing unit specifies the distance to the target object further on the basis of a moving velocity of the imaging unit and a capture time interval between the reference image and the target image in addition to the enlargement rate.

With this configuration, it is possible to specify the distance with higher accuracy.

The invention is not limited to the foregoing embodiments, and various variations/changes are possible within the spirit of the invention.

What is claimed is:

1. A distance measuring apparatus comprising:
a camera that acquires time-series images at a predetermined frame rate
a sensor that detects a moving velocity of the camera; and
at least one processor and at least one memory having at least one program, wherein
the at least one program causes the at least one processor to
generate a plurality of enlarged images obtained by enlarging a reference image acquired before a target image among the time-series images at a plurality of different enlargement rates,
detect a target object that is a subject from the target image,
specify a distance to the detected target object on the basis of the frame rate, the moving velocity, and the enlargement rate of the enlarged image with which the difference is minimum,
binarize the target image in association with each of the detected target objects and obtain a difference between each of the binarized target images and each of the plurality of binarized enlarged images, and
set the enlarged image in which a sum of values obtained by binarizing and inverting a difference between corresponding pixels in a region of an attention object is maximum as an enlarged image with which the difference is minimum.

2. The distance measuring apparatus according to claim 1, wherein
the at least one program causes the at least one processor to specify a distance for each of the target objects on the basis of the enlargement rate of the enlarged image with which the difference is minimum for each of the detected target objects.

3. The distance measuring apparatus according to claim 1, wherein
the at least one program causes the at least one processor to specify the distance to the target object using a predetermined data set in which distances are registered in association with enlargement rates.

4. The distance measuring apparatus according to claim 3, wherein
the at least one program causes the at least one processor to specify the distance to the target object using a predetermined data set in which a distance is registered in further association with a moving velocity of the camera in addition to the enlargement rate.

5. A distance measuring method by a distance measuring apparatus including a camera that acquires time-series images at a predetermined frame rate, a sensor that detects a moving velocity of the camera, and a processing unit that performs image processing, the method comprising:
by the processing unit,
generating a plurality of enlarged images obtained by enlarging a reference image acquired before a target image among the time-series images at a plurality of types of different enlargement rates;
detecting a target object that is a subject from the target image;
specifying a distance to the detected target object on the basis of the frame rate, the moving velocity, and the enlargement rate of the enlarged image with which the difference is minimum,
binarizing the target image in association with each of the detected target objects and obtaining a difference between each of the binarized target images and each of the plurality of binarized enlarged images, and
setting the enlarged image in which a sum of values obtained by binarizing and inverting a difference between corresponding pixels in a region of an attention object is maximum as an enlarged image with which the difference is minimum.

6. A distance measuring apparatus comprising:
a camera that acquires time-series images by an imaging unit; and
at least one processor and at least one memory having at least one program, wherein
the at least one program causes the at least one processor to
generate a plurality of enlarged images obtained by enlarging a reference image acquired before a target image among the time-series images at a plurality of different enlargement rates and obtain a difference between each of the plurality of enlarged images and the target image,
detect a target object that is a subject from the target image,
binarize the target image in association with each of the detected target objects and obtain a difference between each of the binarized target images and each of the plurality of binarized enlarged images, and
specify a distance to the detected target object on the basis of the enlargement rate of the enlarged image with which the difference is minimum,
wherein the enlarged image in which a sum of values obtained by binarizing and inverting a difference between corresponding pixels in a region of an attention object is maximum is an enlarged image with which the difference is minimum.

7. A distance measuring method by a distance measuring apparatus including a camera that acquires time-series images at a predetermined frame rate, a sensor that detects a moving velocity of the camera, and a processing unit that performs image processing, the method comprising:
by the processing unit,
generating a plurality of enlarged images obtained by enlarging a reference image acquired before a target image among the time-series images at a plurality of different enlargement rates and obtaining a difference between each of the plurality of enlarged images and the target image,
detecting a target object that is a subject from the target image,
binarizing the target image in association with each of the detected target objects and obtaining a difference between each of the binarized target images and each of the plurality of binarized enlarged images, and
specifying a distance to the detected target object on the basis of the enlargement rate of the enlarged image with which the difference is minimum,
wherein the enlarged image in which a sum of values obtained by binarizing and inverting a difference between corresponding pixels in a region of an attention object is maximum is an enlarged image with which the difference is minimum.

* * * * *